US010632870B1

(12) United States Patent
Radion et al.

(10) Patent No.: US 10,632,870 B1
(45) Date of Patent: Apr. 28, 2020

(54) INTEGRATED CHILD SEAT UPPER HARNESS ATTACHMENT AND ROUTING METHODS

(71) Applicant: GM Global Technology Operations LLC, Detroit, MI (US)

(72) Inventors: Stephanie C. Radion, Bloomfield Hills, MI (US); Daniel W. Booth, Troy, MI (US); Stephen Rylance, Holly, MI (US); Michele A. DeRonne, Beverly Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/194,869

(22) Filed: Nov. 19, 2018

(51) Int. Cl.
*B60N 2/26* (2006.01)
*B60N 2/30* (2006.01)
*B60N 2/32* (2006.01)
*B60N 2/42* (2006.01)
*B60N 2/28* (2006.01)
*B60R 22/02* (2006.01)

(52) U.S. Cl.
CPC ........... *B60N 2/2812* (2013.01); *B60N 2/265* (2013.01); *B60N 2/286* (2013.01); *B60R 22/024* (2013.01); *B60N 2002/2818* (2013.01); *B60R 2022/025* (2013.01); *B60R 2022/026* (2013.01)

(58) Field of Classification Search
CPC ...... B60N 2/265; B60N 2/2812; B60N 2/286; B60N 2002/2818; B60R 22/024; B60R 22/025; B60R 22/026; B60R 2022/025
USPC ................................................ 297/238, 484
See application file for complete search history.

(56) References Cited

U.S. PATENT DOCUMENTS

| 4,690,455 | A | * | 9/1987 | Bailey | B60N 2/3084 297/238 X |
| 4,749,229 | A | * | 6/1988 | Dorto | B60N 2/286 297/238 X |
| 4,756,573 | A | * | 7/1988 | Simin | B60N 2/3084 297/238 X |
| 4,900,086 | A | * | 2/1990 | Steward | B60N 2/3084 297/238 X |

(Continued)

FOREIGN PATENT DOCUMENTS

| DE | 102005056124 A1 | * | 5/2007 | ........... B60N 2/2812 |
| EP | 0705728 A2 | * | 4/1996 | ............. B60N 2/286 |

OTHER PUBLICATIONS

First Inventor: Stephen Rylance, Unpublished U.S. Appl. No. 16/180,437, filed Nov. 5, 2018.

*Primary Examiner* — Rodney B White

(57) ABSTRACT

A child seat upper harness attachment system includes a vehicle seat having a seat back supported on a seat back support structure and a seat base member. A first shoulder strap extends through at least one first aperture in the seat back and is releasably connected to a multiple attachment point buckle for restraint of a child occupant of the vehicle seat. A second shoulder strap extends through at least one second aperture in the seat back and is releasably connected to the multiple attachment point buckle for restraint of the child occupant. A crotch-strap extends through the seat base member and is releasably connected to the multiple attachment point buckle for restraint of the child occupant. A belt connecting member connects one of the first shoulder strap or the second shoulder strap to the seat back support structure.

16 Claims, 11 Drawing Sheets

(56) References Cited

U.S. PATENT DOCUMENTS

| | | | | |
|---|---|---|---|---|
| 4,900,087 | A * | 2/1990 | Crisp | B60N 2/3084 297/238 X |
| 4,936,627 | A * | 6/1990 | Guim | B60N 2/3084 297/238 |
| 4,943,112 | A * | 7/1990 | Law | B60N 2/3084 297/467 X |
| 4,986,600 | A * | 1/1991 | Leblanc | B60N 2/3084 297/238 X |
| 5,026,118 | A * | 6/1991 | Vander Stel | B60N 2/3084 297/238 |
| 5,106,158 | A * | 4/1992 | Dukatz | B60N 2/3084 297/238 X |
| 5,135,285 | A * | 8/1992 | Dukatz | B60N 2/3084 297/484 X |
| 5,161,855 | A * | 11/1992 | Harmon | B60N 2/3084 297/238 |
| 5,224,756 | A * | 7/1993 | Dukatz | B60N 2/3084 297/238 X |
| 5,260,684 | A * | 11/1993 | Metzmaker | B60N 2/002 340/425.5 |
| 5,280,995 | A * | 1/1994 | Elton | B60N 2/3084 297/484 X |
| 5,282,667 | A * | 2/1994 | Elton | B60N 2/3084 297/484 X |
| 5,282,668 | A * | 2/1994 | Heussner | B60N 2/3084 297/238 X |
| 5,286,084 | A * | 2/1994 | Bart | B60N 2/3084 297/474 X |
| 5,290,090 | A * | 3/1994 | Bell | B60N 2/36 297/468 X |
| 5,312,156 | A * | 5/1994 | Heussner | B60N 2/3084 297/238 X |
| 5,332,284 | A * | 7/1994 | Elton | B60N 2/3084 297/484 X |
| 5,364,169 | A * | 11/1994 | Collins | B60R 22/105 297/484 X |
| 5,366,270 | A * | 11/1994 | Heussner | B60N 2/2878 297/238 |
| 5,380,060 | A * | 1/1995 | Sponsler | B60N 2/3011 297/238 |
| 5,380,067 | A * | 1/1995 | Turvill | A44B 11/2519 297/484 X |
| 5,383,707 | A * | 1/1995 | Osenkowski | B60N 2/3084 297/238 |
| 5,385,384 | A * | 1/1995 | Gierman | B60N 2/3084 297/238 X |
| 5,403,068 | A * | 4/1995 | Fatchett | B60N 2/2352 297/238 X |
| 5,449,216 | A * | 9/1995 | Gierman | B60N 2/3084 297/238 X |
| 5,449,223 | A * | 9/1995 | Miculici | B60R 22/105 297/484 X |
| 5,466,043 | A * | 11/1995 | Lambert | B60N 2/3084 297/238 |
| 5,468,044 | A * | 11/1995 | Coman | B60N 2/3084 297/238 X |
| 5,468,045 | A * | 11/1995 | Weber | B60N 2/2884 297/238 X |
| 5,468,046 | A * | 11/1995 | Weber | B60N 2/3084 297/484 X |
| 5,472,260 | A * | 12/1995 | Czapski | B60N 2/3084 297/467 X |
| 5,476,305 | A * | 12/1995 | Corkins | B60N 2/36 297/238 X |
| 5,498,062 | A * | 3/1996 | Holdampf | B60N 2/3084 297/238 X |
| 5,503,461 | A * | 4/1996 | Schreier | B60N 2/3084 297/484 X |
| 5,527,093 | A * | 6/1996 | Park | B60N 2/3084 297/484 X |
| 5,529,381 | A * | 6/1996 | Zhao | B60R 22/105 297/484 X |
| 5,540,479 | A * | 7/1996 | Thomas | B60N 2/757 297/238 X |
| 5,564,780 | A * | 10/1996 | Presser | B60N 2/2878 297/238 |
| 5,568,959 | A * | 10/1996 | Weber | B60N 2/757 297/238 |
| 5,588,700 | A * | 12/1996 | Homier | B60N 2/3084 297/238 X |
| 5,601,334 | A * | 2/1997 | Marks | B60N 2/3084 297/238 X |
| 5,603,550 | A * | 2/1997 | Holdampf | B60N 2/3013 297/238 X |
| 5,611,603 | A * | 3/1997 | Gray | B60R 22/105 297/476 |
| 5,639,144 | A * | 6/1997 | Naujokas | B60N 2/2827 297/472 X |
| 5,653,504 | A * | 8/1997 | Henson | B60N 2/3084 297/484 X |
| 5,662,377 | A * | 9/1997 | Holdampf | B60N 2/3013 297/238 X |
| 5,681,094 | A * | 10/1997 | Brown | B60N 2/2812 297/484 |
| 5,700,054 | A * | 12/1997 | Lang | B60N 2/3084 297/238 |
| 5,704,684 | A * | 1/1998 | Dukatz | B60N 2/3084 297/484 X |
| 5,704,685 | A * | 1/1998 | Handa | B60N 2/3084 297/238 |
| 5,716,097 | A * | 2/1998 | Peck | B60N 2/3084 297/475 X |
| 5,743,593 | A * | 4/1998 | Vogt | B60N 2/3084 297/238 |
| 5,775,771 | A * | 7/1998 | La Cour | B60N 2/3084 297/238 X |
| 5,803,543 | A * | 9/1998 | Hartmann | B60N 2/28 297/256 X |
| 5,806,926 | A * | 9/1998 | Parsons | B60N 2/3081 297/238 X |
| 5,899,534 | A * | 5/1999 | Gray | B60N 2/3084 297/484 |
| 6,048,027 | A * | 4/2000 | Peck | B60N 2/3084 297/238 |
| 6,089,662 | A * | 7/2000 | Lambert | B60R 22/105 297/484 X |
| 6,364,417 | B1 * | 4/2002 | Silverman | A47D 15/006 297/484 X |
| 6,402,251 | B1 * | 6/2002 | Stoll | B60N 2/265 297/484 X |
| 6,547,334 | B1 * | 4/2003 | Girardin | B60R 22/105 297/484 X |
| 6,616,242 | B1 * | 9/2003 | Stoll | B60N 2/265 297/484 X |
| 6,688,701 | B1 * | 2/2004 | Weaver | B60R 22/024 297/484 X |
| 7,029,067 | B2 * | 4/2006 | Vits | B60N 2/242 297/484 X |
| 7,070,239 | B1 * | 7/2006 | Ugrekhelidze | B60N 2/3084 297/105 |
| 7,261,381 | B2 * | 8/2007 | Tsai | B60N 2/2812 297/467 X |
| 7,770,969 | B2 * | 8/2010 | Boyle | B60N 2/2806 297/484 X |
| 8,210,617 | B2 * | 7/2012 | Aaron | B60N 2/2833 297/484 X |
| 8,360,521 | B2 * | 1/2013 | Macliver | B60N 2/2812 297/484 X |
| 9,227,535 | B2 * | 1/2016 | Coman | B60N 2/3084 |
| 9,238,424 | B1 * | 1/2016 | Foster | B62B 9/108 |
| 9,764,662 | B1 * | 9/2017 | Ramos Valencia | B60N 2/3084 |
| 2002/0030394 | A1 * | 3/2002 | Ito | B60N 2/3084 297/256 |
| 2003/0025380 | A1 * | 2/2003 | Vits | B60N 2/242 297/483 |
| 2003/0173817 | A1 * | 9/2003 | Vits | B60N 2/265 297/484 |

(56) References Cited

U.S. PATENT DOCUMENTS

| | | | |
|---|---|---|---|
| 2007/0001495 A1* | 1/2007 | Boyle | B60N 2/2806 297/484 X |
| 2007/0040441 A1* | 2/2007 | Boyle | B60N 2/2806 297/467 |
| 2008/0168603 A1* | 7/2008 | Ayette | A61G 1/044 297/484 X |
| 2013/0162001 A1* | 6/2013 | Dignitti | A47D 15/006 297/467 |
| 2013/0187421 A1* | 7/2013 | Foye | B60R 22/024 297/232 |
| 2014/0062160 A1* | 3/2014 | Conley | B60N 2/2812 297/440.15 |
| 2015/0130235 A1* | 5/2015 | Herut | B60N 2/2878 297/238 |
| 2016/0016534 A1* | 1/2016 | Nagasawa | B60R 22/12 297/484 X |
| 2017/0267130 A1* | 9/2017 | Dingman | B60N 2/2812 |
| 2019/0009695 A1* | 1/2019 | Schonfeld | B60N 2/0292 |

\* cited by examiner

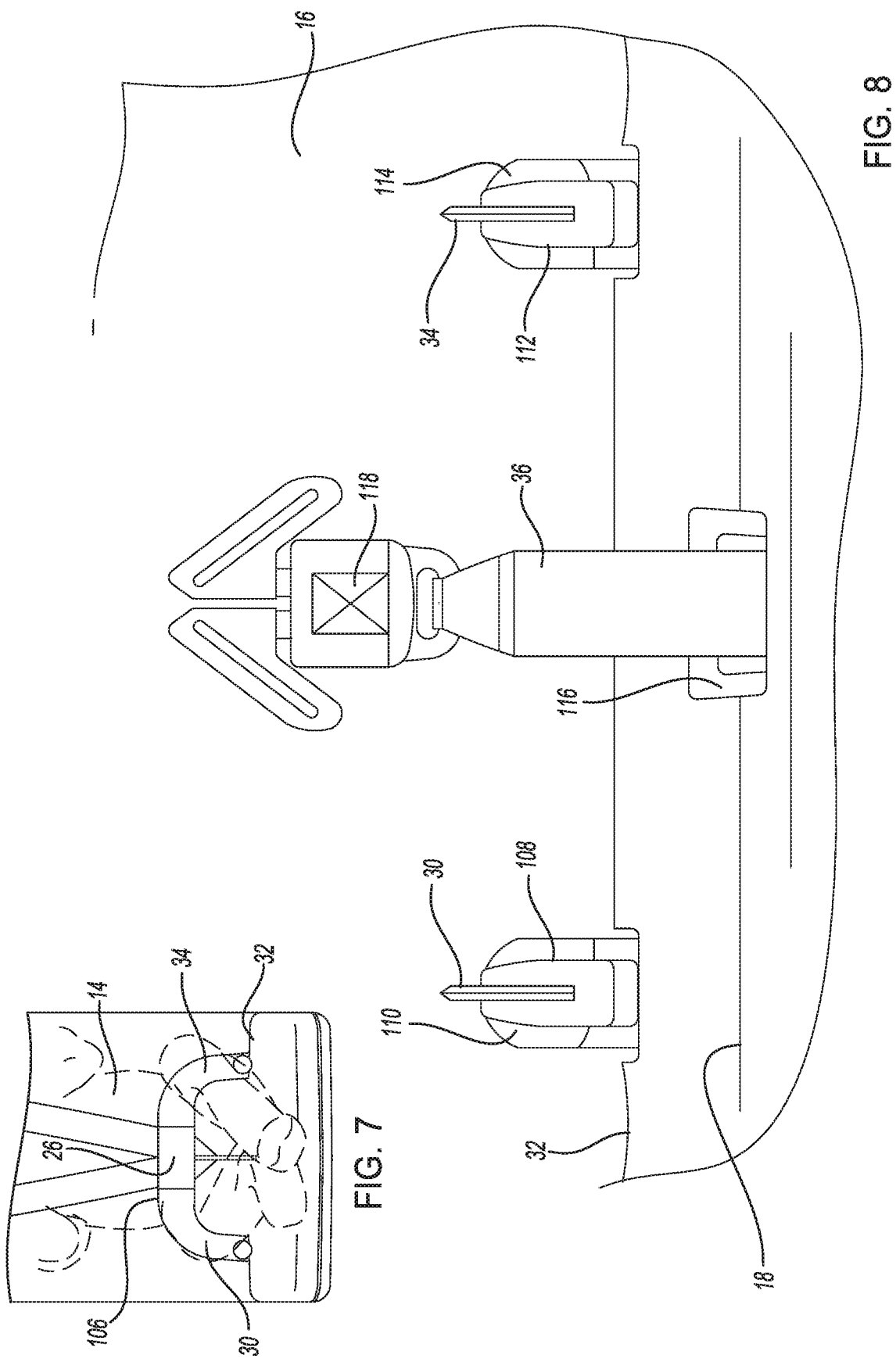

INTEGRATED CHILD SEAT UPPER HARNESS ATTACHMENT AND ROUTING METHODS

INTRODUCTION

The present disclosure relates to seat configurations, passenger restraint devices and seat support configurations for vehicle passenger seats.

Automobile vehicles, including shared-ride vehicles are required to provide occupant restraint systems. Vehicle users with children requiring a vehicle safety seat are commonly required to bring their own child seat for vehicle use and then carry the child seat after arrival at their destination. The seatbelt configuration of shared-ride vehicles is normally configured for adults, therefore significant time is often required for a user with a child seat to reconfigure the seat belt arrangement, including adding necessary extenders or coupling members to load the child seat. Features such as seatbelt extenders may or may not be accessible in the vehicle or may be missing after a previous use without proper re-stowage. Adult passengers who enter the vehicle at a later time may also find the reconfigured seatbelt arrangement inappropriate for ease of use. This loading and unloading situation is time intensive, detracts from the shared-ride convenience and may also impact arrival or departure of other passengers in the vehicle.

Thus, while current shared-ride vehicle seating configurations achieve their intended purpose, there is a need for a new and improved system and method for accommodating shared-ride child restraints.

SUMMARY

According to several aspects, a child seat upper harness attachment system includes a vehicle seat having a seat back and a seat base member. A first shoulder strap extends through at least one first aperture in the seat back and is releasably connected to a multiple attachment point buckle for restraint of a child occupant of the vehicle seat. A second shoulder strap extends through at least one second aperture in the seat back and is releasably connected to the multiple attachment point buckle for restraint of the child occupant. A crotch-strap extends through the seat base member and is releasably connected to the multiple attachment point buckle for restraint of the child occupant. The first shoulder strap, the second shoulder strap and the crotch-strap are removed from a storage location in or behind the vehicle seat when the child occupant is present.

In another aspect of the present disclosure, a first belt retractor assembly allows extension and retraction of the first shoulder strap; and a second belt retractor assembly allows extension and retraction of the second shoulder strap.

In another aspect of the present disclosure, the first belt retractor assembly and the second belt retractor assembly are fixed to a rear surface of the seat back.

In another aspect of the present disclosure, the at least one first aperture defines multiple first elongated apertures each having a common spacing between successive ones of the first elongated apertures.

In another aspect of the present disclosure, the at least one second aperture defines multiple second elongated apertures each having a common spacing between successive ones of the second elongated apertures; and predetermined ones of the first elongated apertures and the second elongated apertures are oriented at a common elevation and define aperture pairs.

In another aspect of the present disclosure, a plate is fixed on a rear surface of the seat base member of the vehicle seat; and a cavity member is positioned above the plate which is also fixed to the rear surface.

In another aspect of the present disclosure, a first latch member and a second latch member are both normally stored within a rear-facing cavity defined by the cavity member, each of the first latch member and the second latch member having an elongated slot adapted to slidably receive one of the first shoulder strap or the second shoulder strap.

In another aspect of the present disclosure, a first rail is fixed to the plate and is oriented substantially vertically. A second rail is fixed to the plate and is oriented substantially parallel to the first rail. Each of the first rail and the second rail have multiple elongated apertures which are equally spaced apart from successive ones of the elongated apertures of each rail, with pairs of the elongated apertures of the first rail and the second rail located at a common elevation.

In another aspect of the present disclosure, the first latch member when removed from the rear-facing cavity is releasably received in one of the elongated apertures of the first rail; and the second latch member when removed from the rear-facing cavity is releasably received in a paired one of the elongated apertures of the second rail.

In another aspect of the present disclosure, each of the first latch member and the second latch member includes: an elongated member having the elongated slot therein; a latch member rod extending from the elongated member; each of the first latch member and the second latch member includes: an elongated member having the elongated slot therein; a latch member rod extending from the elongated member; and a barrel portion oriented perpendicular to the latch member rod.

According to several aspects, a child seat upper harness attachment system includes a vehicle seat having a seat back supported on a seat back structure and a seat base member. A first shoulder strap extends through at least one first aperture in the seat back and is releasably connected to a multiple attachment point buckle for restraint of a child occupant of the vehicle seat. A second shoulder strap extends through at least one second aperture in the seat back and is releasably connected to the multiple attachment point buckle for restraint of the child occupant. A crotch-strap extends through the seat base member and is releasably connected to the multiple attachment point buckle for restraint of the child occupant. At least one belt connecting member connects one of the first shoulder strap or the second shoulder strap to the seat back support structure.

In another aspect of the present disclosure, the seat back support structure includes at least one sinuous tube member having at least one horizontal tube portion with the at least one belt connecting member defining a hook member releasably connected to the at least one horizontal tube portion.

In another aspect of the present disclosure, the at least one belt connecting member defines a first belt connecting member attached to the first shoulder strap and a second belt connecting member attached to the second shoulder strap; and the at least one sinuous tube member defines first and second sinuous tube members oriented parallel to each other.

In another aspect of the present disclosure, the at least one horizontal tube portion defines multiple horizontal tube portions of each of the first and second sinuous tube members, with pairs of the horizontal tube portions of each of the first and second sinuous tube members oriented at common elevations.

In another aspect of the present disclosure, the seat back support structure includes at least one sinuous tube member having at least one extended length vertical portion with the at least one belt connecting member defining a hook member releasably connected to the at least one extended length vertical portion.

In another aspect of the present disclosure, a storage cavity is created below a surface of the seat base member. The storage cavity includes: a first depth cavity portion wherein the crotch-strap is positioned for storage of the crotch-strap; and a second depth cavity portion which is deeper than the first depth cavity portion, the second depth cavity portion receiving a releasable buckle member of the crotch-strap for storage of the releasably buckle member.

In another aspect of the present disclosure, a storage cavity is created in the vehicle seat, wherein the first shoulder strap, the second shoulder strap and the crotch-strap are removed from the storage location when the child occupant is present.

According to several aspects, a child seat upper harness attachment system includes a vehicle seat having a seat back supported on a seat back structure and a seat base member meeting the seat back at a bite-line located at a junction between the seat back and the seat base member. A first shoulder strap extends through the bite-line and is releasably connected to a multiple attachment point buckle for restraint of a child occupant of the vehicle seat. A second shoulder strap extends through the bite-line and is releasably connected to the multiple attachment point buckle for restraint of the child occupant. A crotch-strap extends through the seat base member and is releasably connected to the multiple attachment point buckle for restraint of the child occupant. A first belt connecting member releasably connects the first shoulder strap to the seat support structure and a second belt connecting member releasably connects the second shoulder strap to the seat back support structure. The first belt connecting member and the second belt connecting member are positioned at a common elevation when connected to the seat support structure. A storage cavity is created in the vehicle seat. The first shoulder strap, the second shoulder strap and the crotch-strap are removed from the storage location when the child occupant is present.

In another aspect of the present disclosure, the seat support structure includes parallel first and second sinuous tube members. The first and second belt connecting members each define a hook member for releasable connection to one of the sinuous tube members.

In another aspect of the present disclosure, the seat support structure includes parallel first and second rails each having multiple elongated apertures which are equally spaced apart from successive ones of the elongated apertures. The first and second belt connecting members each define a latch member having a barrel portion received in one of the elongated apertures with the barrel portion thereafter rotated approximately 90 degrees to inhibit release of the latch member from the first or second rail.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 7 is a front elevational view of a child seat upper harness attachment system according to another exemplary embodiment;

FIG. 8 is a front elevational view of a restraint system for the embodiment of FIG. 7;

DETAILED DESCRIPTION

The following description is merely exemplary in nature and is not intended to limit the present disclosure, application, or uses.

Figure 1:
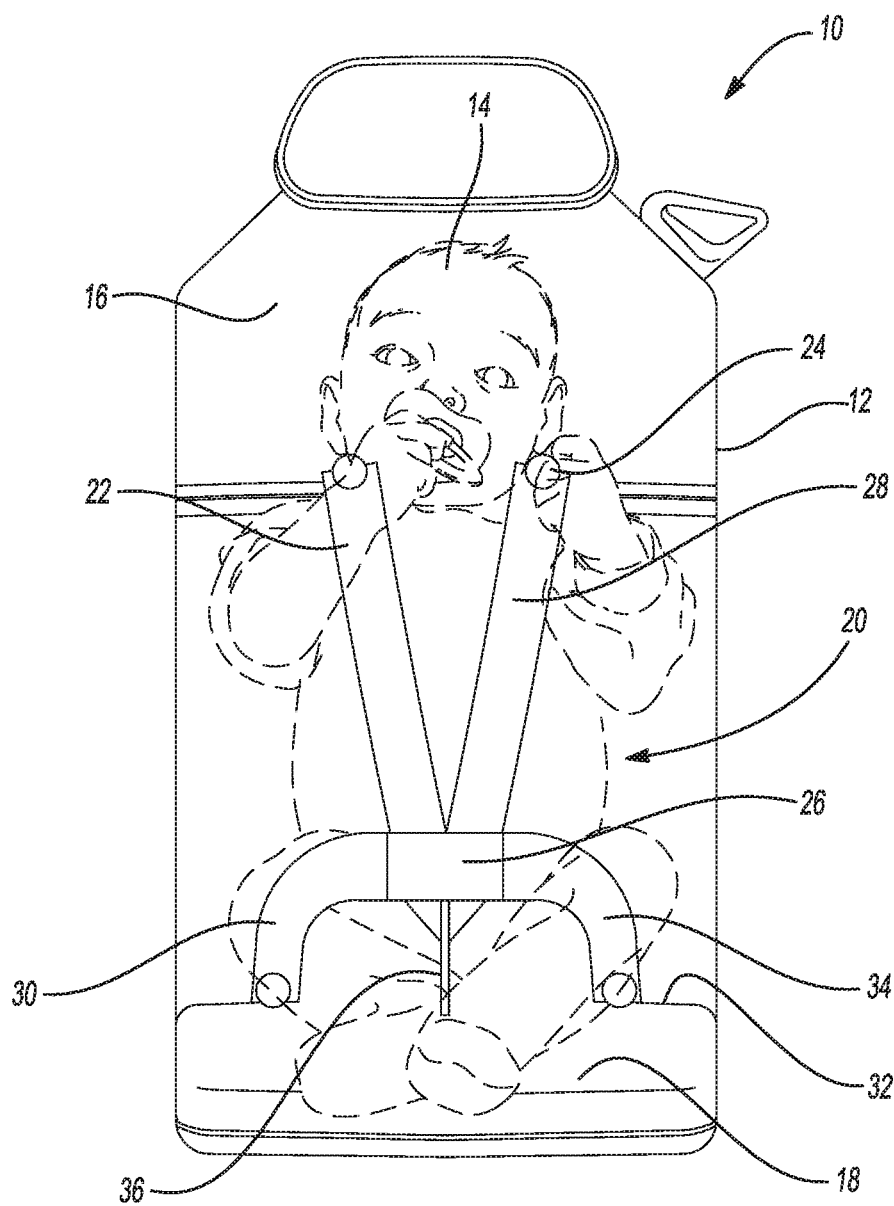
FIG. 1 is a front elevational view of a child seat upper harness attachment system according to an exemplary embodiment.

Referring to FIG. 1, a child seat upper harness attachment system 10 is provided with a vehicle seat 12 and is adapted to restrain a child occupant 14 against a seat back 16 and onto a seat base member 18. A seatbelt configuration 20 is provided which is anchored to the vehicle seat 12 and includes a right-side or first shoulder strap 22 which extends outwardly from one or more apertures 24 created in the seat back 16, over a right side of the child occupant 14 and is releasably latched to a five-point buckle 26. The seatbelt configuration 20 also includes a left-side or second shoulder strap 28 which extends outwardly from the one or more apertures 24 created in the seat back 16, over a left side of the child occupant 14 and is releasably latched to the five-point buckle 26. A right-side waist strap 30 extends outwardly from a bite-line 32 located at a junction between the seat back 16 and the seat base member 18, partially about a waist of the child occupant 14, and is also releasably connected to the five-point buckle 26. Similarly, left-side waist strap 34 extends outwardly from the bite-line 32 and partially about the waist of the child occupant 14, and is releasably connected to the five-point buckle 26. A crotch-strap 36 extends upwardly through the seat base member 18 between the legs of the child occupant 14 and is fixedly connected to the five-point buckle 26.

Referring to FIG. 2 and again to FIG. 1, multiple features are provided with the child seat upper harness attachment system 10 to accommodate different sizes of the child occupant 14 and to store components of the system both when in use and when not in use. A plate 40 is fixed on a rear surface 38 of the vehicle seat 12 and a cavity member 42 is positioned above the plate 40 which is also fixed to the rear surface 38. The plate 40 supports a first rail 44 which is fixed to the plate 40 and is oriented substantially vertically, and a second rail 46 which is fixed to the plate 40 and is oriented substantially parallel to the first rail 44. Each of the first rail 44 and the second rail 46 are identical therefore the following discussion of the first rail 44 applies equally to the second rail 46. The first rail 44 includes multiple elongated apertures 48 which are equally spaced apart from successive ones of the elongated apertures. Pairs of the elongated apertures are defined for the first rail 44 and the second rail 46, such as a first aperture pair 50. Each aperture pair 50 includes an elongated aperture of each of the first rail 44 and the second rail 46 which are located at a common elevation.

Figure 4:
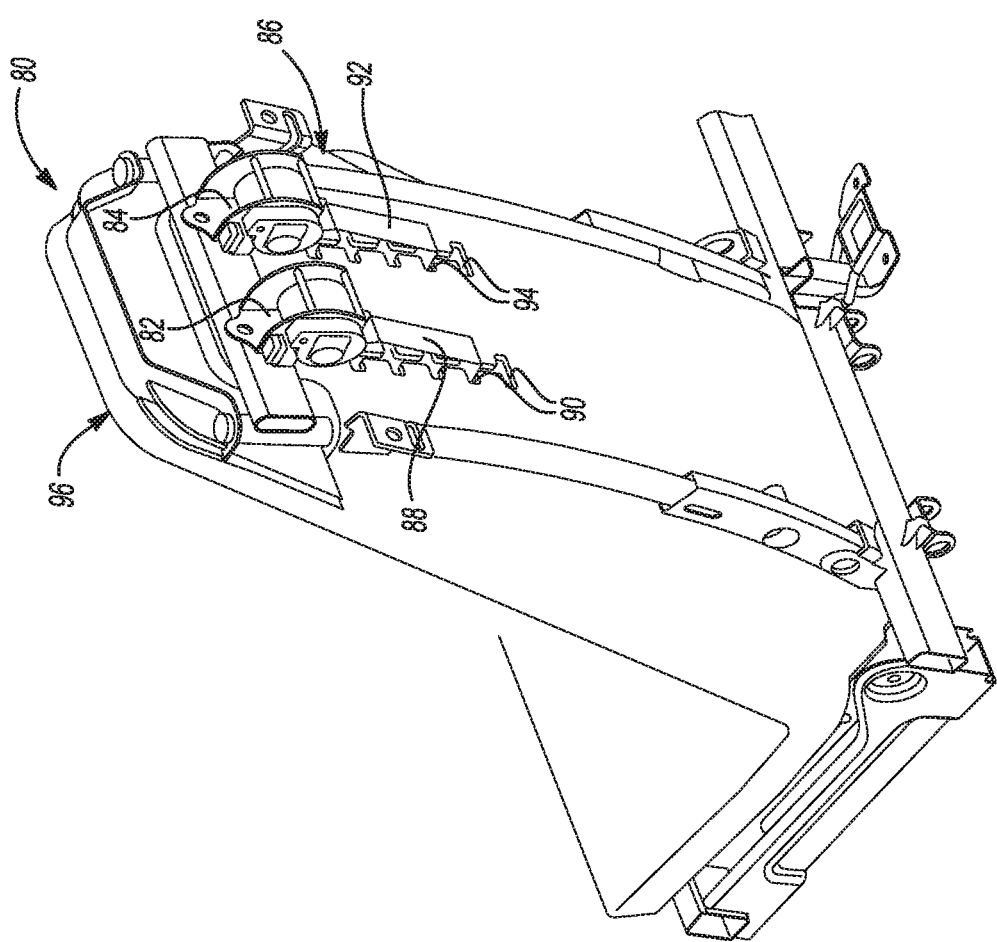
FIG. 4 is a left rear perspective view of another aspect of a child seat upper harness attachment system.
Figure 6:
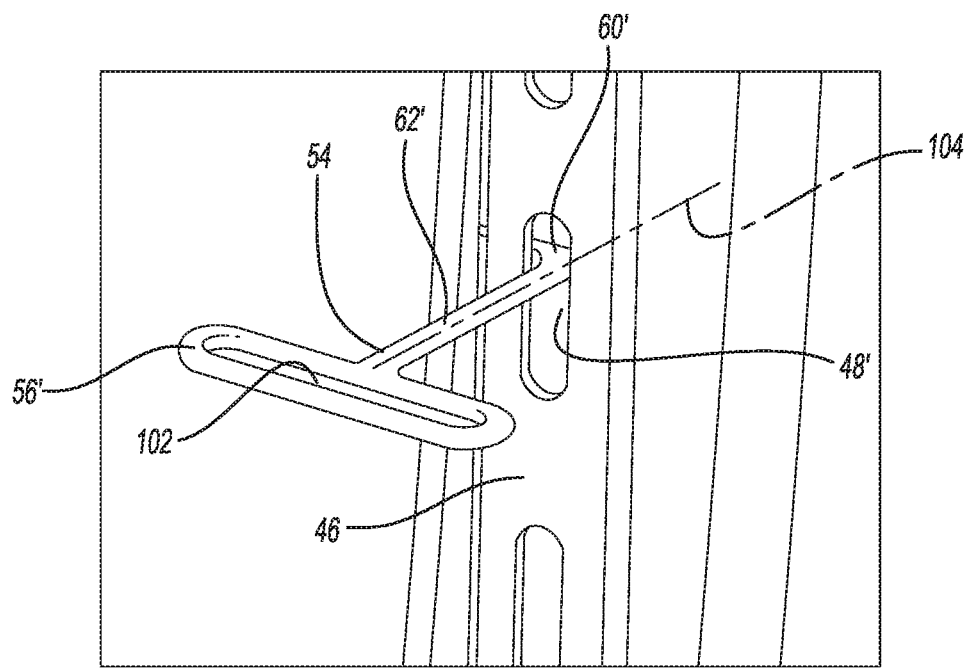
FIG. 6 is a right rear perspective view taken at area 6 of FIG. 5.

A first latch member 52 shown in a deployed position is releasably received in one of the elongated apertures 48a of the first rail 44 and a second latch member 54 shown in a deployed position is releasably received in a paired one of the elongated apertures, such as elongated aperture 48b of the second rail 46. Each of the first latch member 52 and the second latch member 54 are identical and have an elongated member 56 adapted to receive a seat belt described in greater detail in reference to FIGS. 4 and 6.

When the first latch member 52 and the second latch member 54 are not in use, identified as first latch member 52' and second latch member 54', they are stored within a rear-facing cavity 58 defined by the cavity member 42. Each of the latch members such as the first latch member 52' includes a barrel portion 60 oriented perpendicular to a latch member rod 62 to which the elongated member 56' is fixed. The first latch member 52' is stored by suspending the barrel portion 60 from a first pair of hooks 64 fixed and extending away from the cavity member 42. Similarly, the second latch member 54' is stored by suspending its barrel portion 60' from a second pair of hooks 66 also fixed and extending away from the cavity member 42. A seat belt 68 having a buckle 70 is also stored in the rear facing cavity 58 when not in use.

Figure 2:
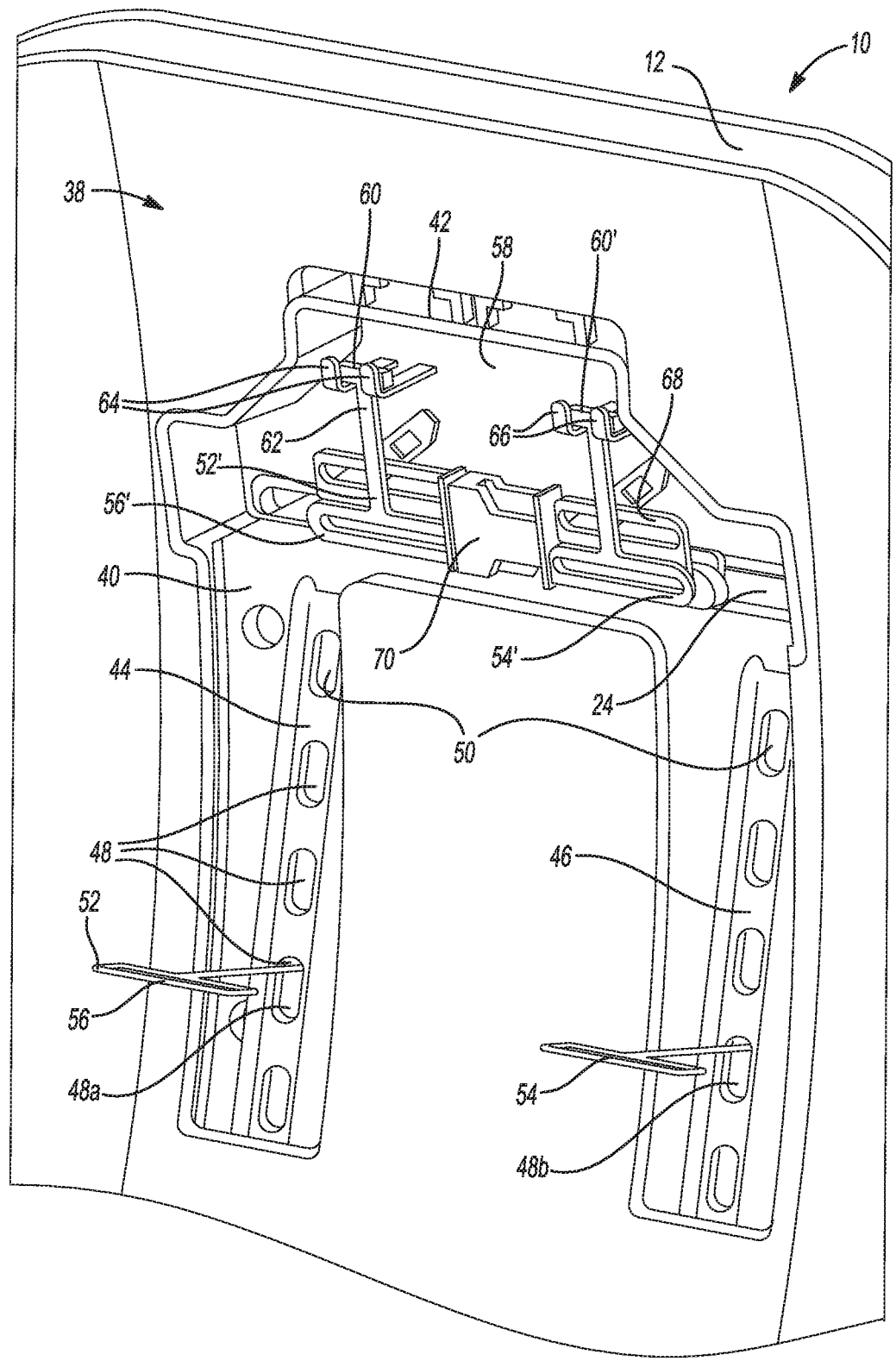
FIG. 2 is a right rear perspective view of the child seat upper harness attachment system of FIG. 1.

Referring to FIG. 3 and again to FIG. 2, a cover 72 is provided which is sized to overlay the cavity member 42. The cover 72 when in the closed position shown is oriented substantially flush with a seat back surface 74. The cover 72 provides a first opening 76 and a second opening 78 which provide finger access openings for a user to access and remove the cover 72 to either store the latch members (as shown in FIG. 2) and the seat belt 68 (only partially shown in this view), or to remove and deploy the latch members such as the deployed first latch member 52 and the second latch member 54 as shown.

Figure 3:
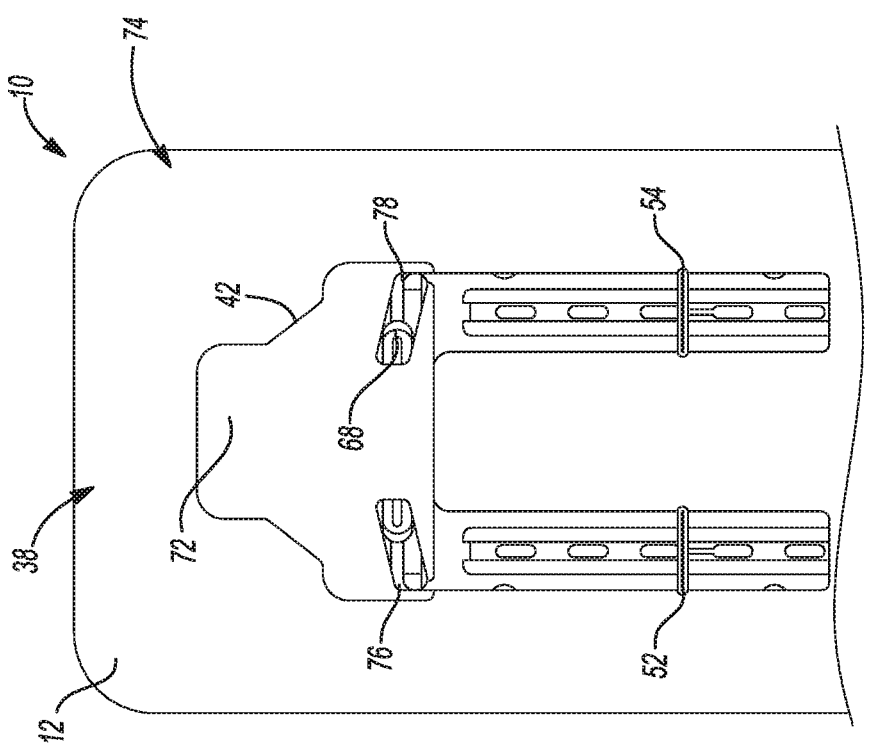
FIG. 3 is a rear elevational view of the child seat upper harness attachment system of FIG. 1.

Referring to FIG. 4 and again to FIGS. 1 through 3, a child seat upper harness attachment system 80 is modified from the child seat upper harness attachment system 10, therefore only the differences will be further discussed herein. The child seat upper harness attachment system 80 includes a first belt retractor assembly 82 and a second belt retractor assembly 84 each fixed to a seat back 86 of the vehicle seat.

A first shoulder strap 88 is extended from the first belt retractor assembly 82 and is fed through one of multiple slots 90 created through the seat back 86 and functions similar to the left-side or second shoulder strap 28 described in reference to FIG. 1. A second shoulder strap 92 is extended from the second belt retractor assembly 84 and is fed through one of multiple slots 94 created through the seat back 86 and functions similar to the right-side or first shoulder strap 22 described in reference to FIG. 1. The multiple slots 90 and the multiple slots 94 are aligned in horizontal pairs similar to the aperture pairs 50 described in reference to FIG. 2, such that the first shoulder strap 88 and the second shoulder strap 92 exit through a seat front face 96 at a predetermined common elevation from the slots 90, 94 based on a height of the child occupant of the vehicle seat.

Referring to FIG. 5 and again to FIGS. 1 through 4, each of the first latch member 52 and the second latch member 54 are releasably connected. Each of the first latch member 52 and the second latch member 54 can be raised in an upward direction 98 for example from the elongated aperture 48b up to an elongated aperture 48c or lowered in a downward direction 100 for example from the elongated aperture 48b to an elongated aperture 48d.

Figure 5:
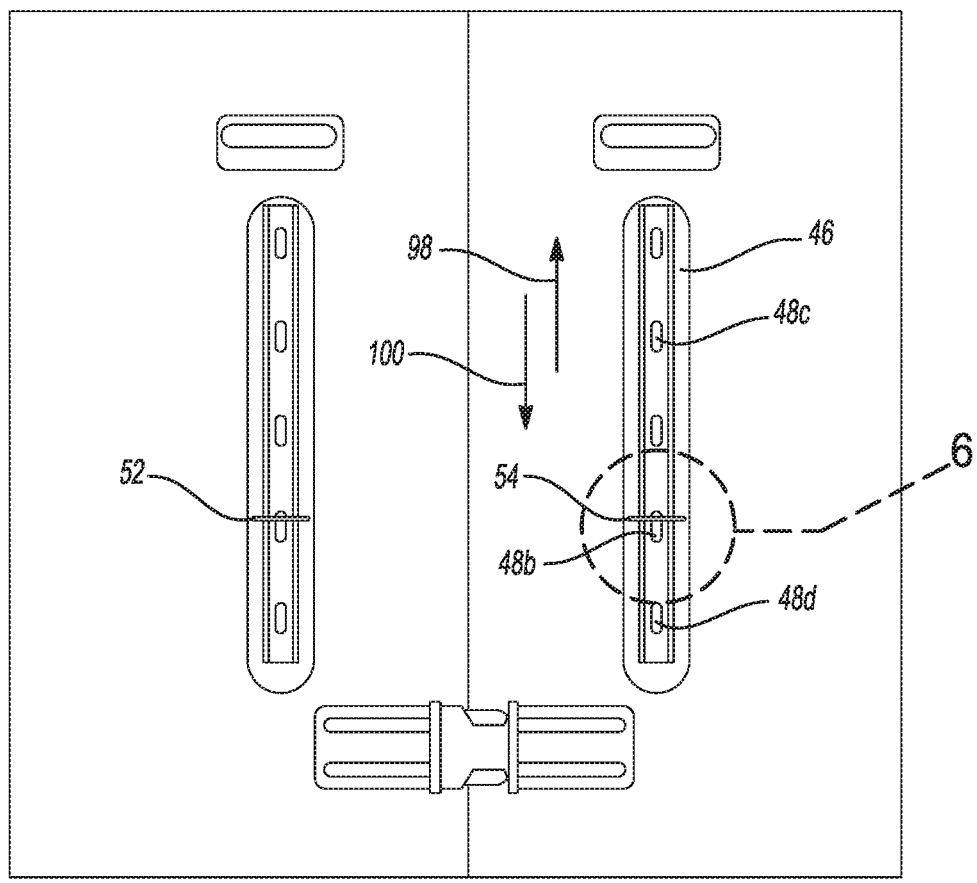
FIG. 5 is a rear elevational view of a child seat upper harness attachment system modified from FIG. 3.

Referring to FIG. 6 and again to FIG. 5, each of the first latch member 52 and the second latch member 54 (the second latch member 54 is shown as an example) include an elongated slot 102 through which a seat belt is extended, with the elongated member 56, 56' providing a height adjustable guide for the seat belt. The first latch member 52 and the second latch member 54 are releasably attached by first rotating the barrel portion 60, 60' approximately 90 degrees to a vertical orientation, inserting the barrel portion 60, 60' into one of the elongated apertures 48, 48' and then axially rotating the latch member rod 62, 62' about a longitudinal axis 104 of the latch member rod 62, 62' approximately 90 degrees until the barrel portion 60, 60' is oriented in a horizontal orientation shown. This horizontal orientation of the barrel portion 60, 60' precludes release of the first latch member 52 or the second latch member 54 until the latch member is again rotated to release the barrel portion 60, 60'.

Referring to FIG. 7 and again to FIG. 1, according to several aspects, the right-side waist strap 30 can be released from a normally hidden storage position within the bite-line 32 and connected to the five-point buckle 26 across a waist 106 of the child occupant 14. Similarly, the left-side waist strap 34 can be released from a normally hidden storage position within the bite-line 32 and connected to the five-point buckle 26 across the waist 106 of the child occupant 14. The crotch-strap 36 is folded down and is out of sight in this view.

Referring to FIG. 8 and again to FIG. 7, further access to the right-side waist strap 30 in a stowed position shown can be provided by a release connector 108 accessible through a clearance aperture 110 created above the bite-line 32 and through the seat back 16. Similarly, access to the left-side waist strap 34 in a stowed position shown can be provided by a release connector 112 accessible through a clearance aperture 114 created above the bite-line 32 and through the seat back 16. The crotch-strap 36 is shown in a deployed position after lifting out of a storage cavity 116 provided in the seat base member 18 with a releasable buckle member 118 at an end of the crotch-strap 36 adapted for connection to the five-point buckle 26.

Figure 9:
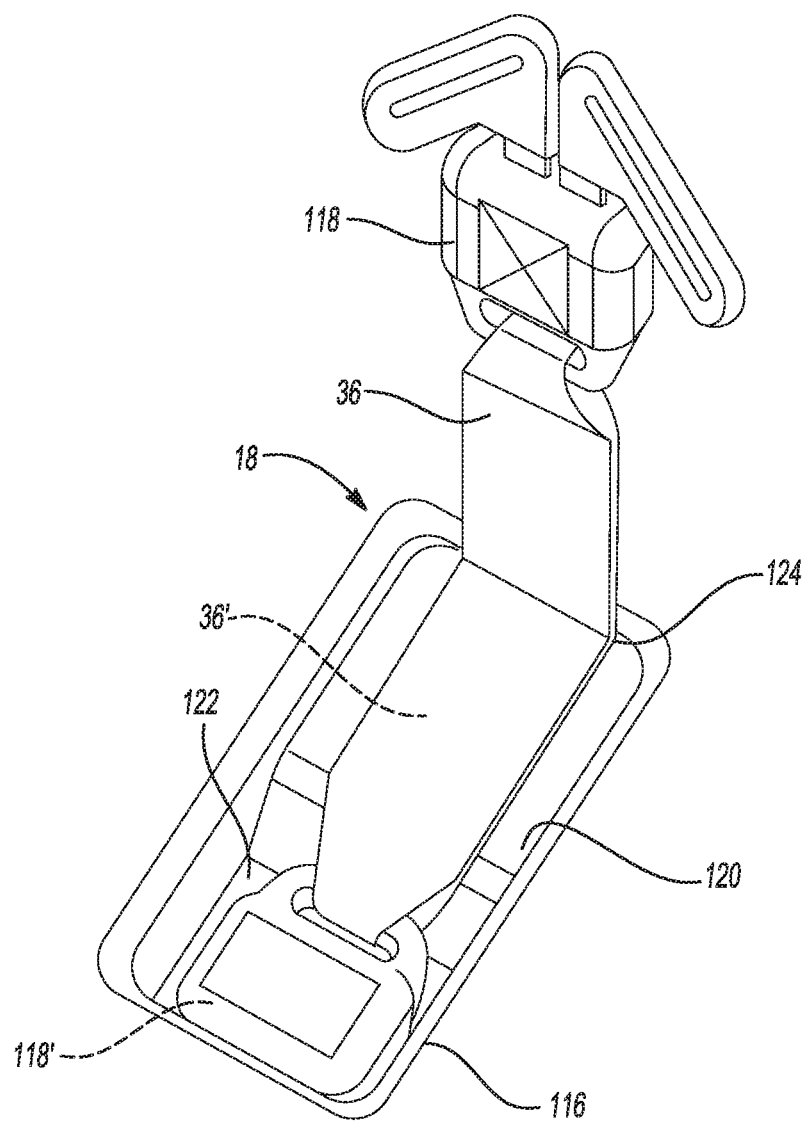
FIG. 9 is a restraint system similar to FIG. 8 in each of a deployed and a stowed position.

Referring to FIG. 9 and again to FIG. 8, the crotch-strap 36 is shown in each of a deployed position and a stowed position. In the stowed position, the crotch-strap 36' is positioned within the storage cavity 116 below a surface of the seat base member 18 in a first depth cavity portion 120 of the storage cavity 116. To accommodate the thickness of the releasable buckle member 118 below the surface of the seat base member 18, the storage cavity 116 includes a second depth cavity portion 122 which is deeper than the first depth cavity portion 120. The releasable buckle member 118 is stored within the second depth cavity portion 122. The crotch-strap 36 extends upwardly into the first depth cavity 120 of the storage cavity 116 through an opening 124 of the seat base member 18. According to several aspects, the storage cavity 116 is provided with a flip-up or releasable cushion feature that covers the storage cavity 116 when the crotch-strap 36 and the releasable buckle member 118 are in a stowed position within the storage cavity 116.

Referring to FIG. 10 and again to FIGS. 4 through 9, a seatbelt configuration 126 is adaptable for use with any one of the child seat upper harness attachment systems described herein. The seatbelt configuration 126 includes a first belt retractor assembly 128 having an extendable seat belt 130 which is fed through a first chest connector 132, and which can be further connected to a first buckle coupling member 134. The first buckle coupling member 134 includes a slot 136 through which the seat belt 130 is led and a male connector 138. In lieu of the buckle coupling member 134, the seat belt 130 can be connected to a standard buckle connector 140 which can be releasably connected to a buckle member 142. The buckle member 142 is in turn connected to a fixed seat belt 144.

The seatbelt configuration 126 can further include a second chest connector 146, with each of the first chest connector 132 and the second chest connector 146 having pairs of slots 148 allowing for adjustable positioning of the first chest connector 132 along the seat belt 130 and for adjustable positioning of the second chest connector 146 along a second seat belt 130' extended from a second belt retractor assembly 128' when the first chest connector 132 and the second chest connector 146 are releasably coupled together. The first buckle coupling member 134 receiving the seat belt 130 and a second buckle coupling member 150 receiving the seat belt 130' through slots 152 are then releasably coupled using the male connector 138 of the first buckle coupling member 134 and a male connector 154 of the second buckle coupling member 150 to a 3-point harness buckle 156. A crotch-strap 158 is fixedly connected by a loop member 160 to the 3-point harness buckle 156. Any of the fixed seat belts 144, 144' include a connecting ring 161 at a free end which allow the fixed seat belts 144, 144' to be fixed using a fastener to seat structure or to vehicle structure.

Figure 11:
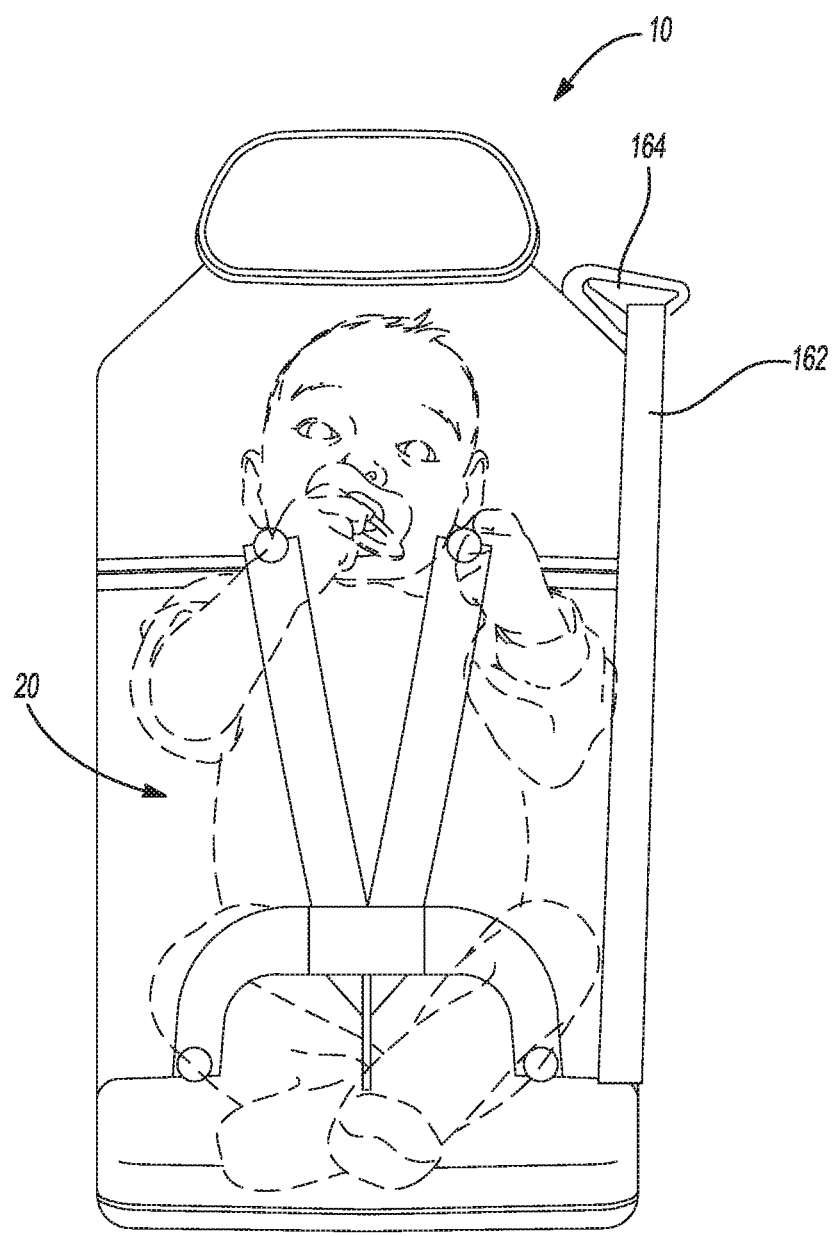
FIG. 11 is a front elevational view of the child seat upper harness attachment system of FIG. 1 further including an adult seat belt.

Referring to FIG. 11 and again to FIG. 1, the vehicle seat 12 is also adapted to restrain an adult occupant (not shown) using a shoulder strap 162. The shoulder strap 162 is led through a shoulder belt retainer 164 which is fixed to the vehicle seat 12 proximate to a shoulder height of the adult occupant.

Referring to FIG. 12 and again to FIGS. 2 through 6, a child seat upper harness attachment system 166 is modified from the child seat upper harness attachment system 10 as follows. The child seat upper harness attachment system 166 includes a seat back support structure 168 to which is attached at least one sinuous tube member 170 facing toward a passenger or a child passenger seated on the vehicle seat. A first seat belt 172 is releasably attached to the tube member 170 using a hook member defining a first hooked belt clip 174, with the first seat belt 172 extending through one of multiple slots such as the multiple slots 90 described in reference to FIG. 4 created through the seat back (not shown in this view for clarity).

Figure 10:
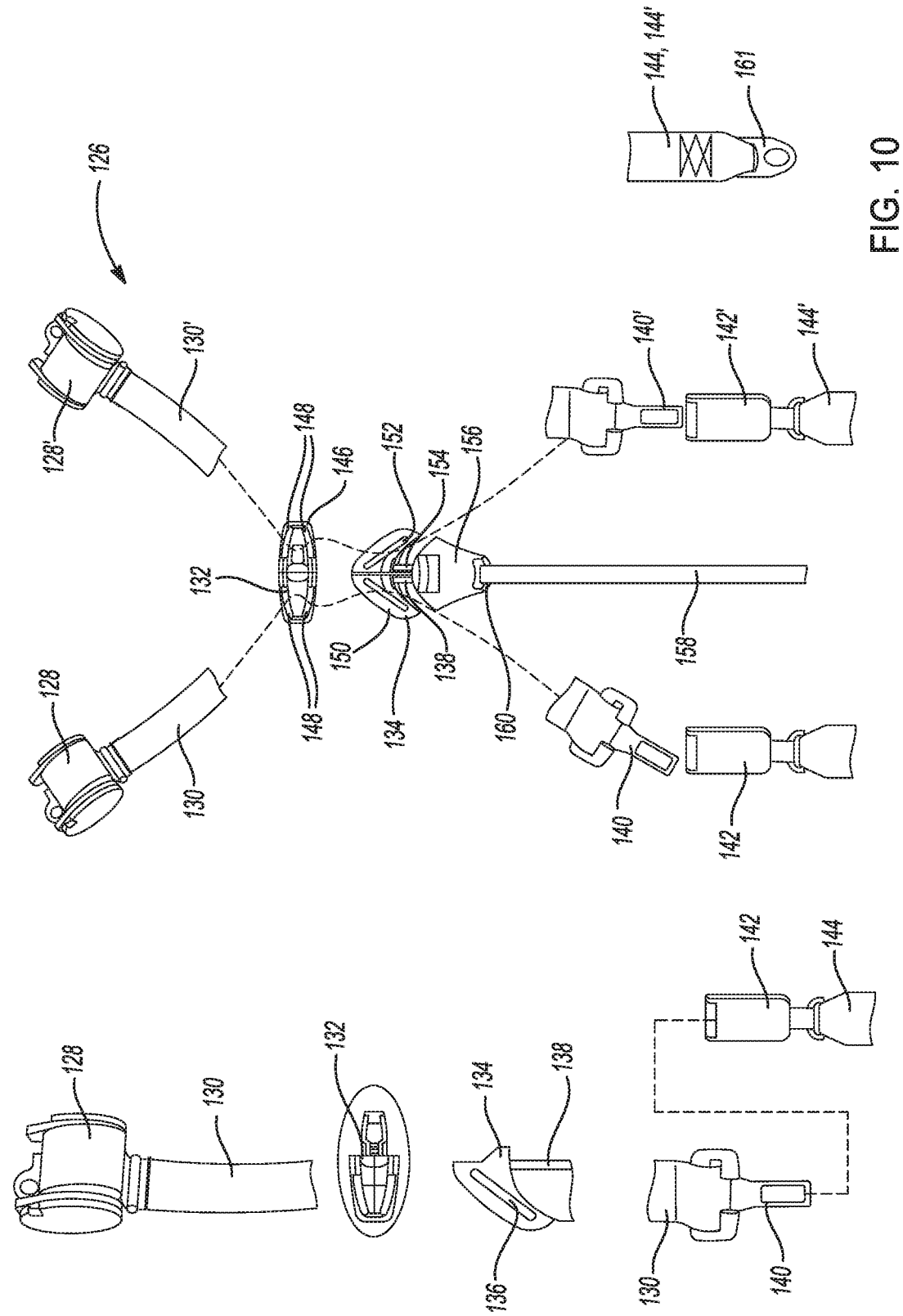
FIG. 10 is an exploded assembly view of a seatbelt system for use with the child seat upper harness attachment system of the present disclosure.
Figure 12:
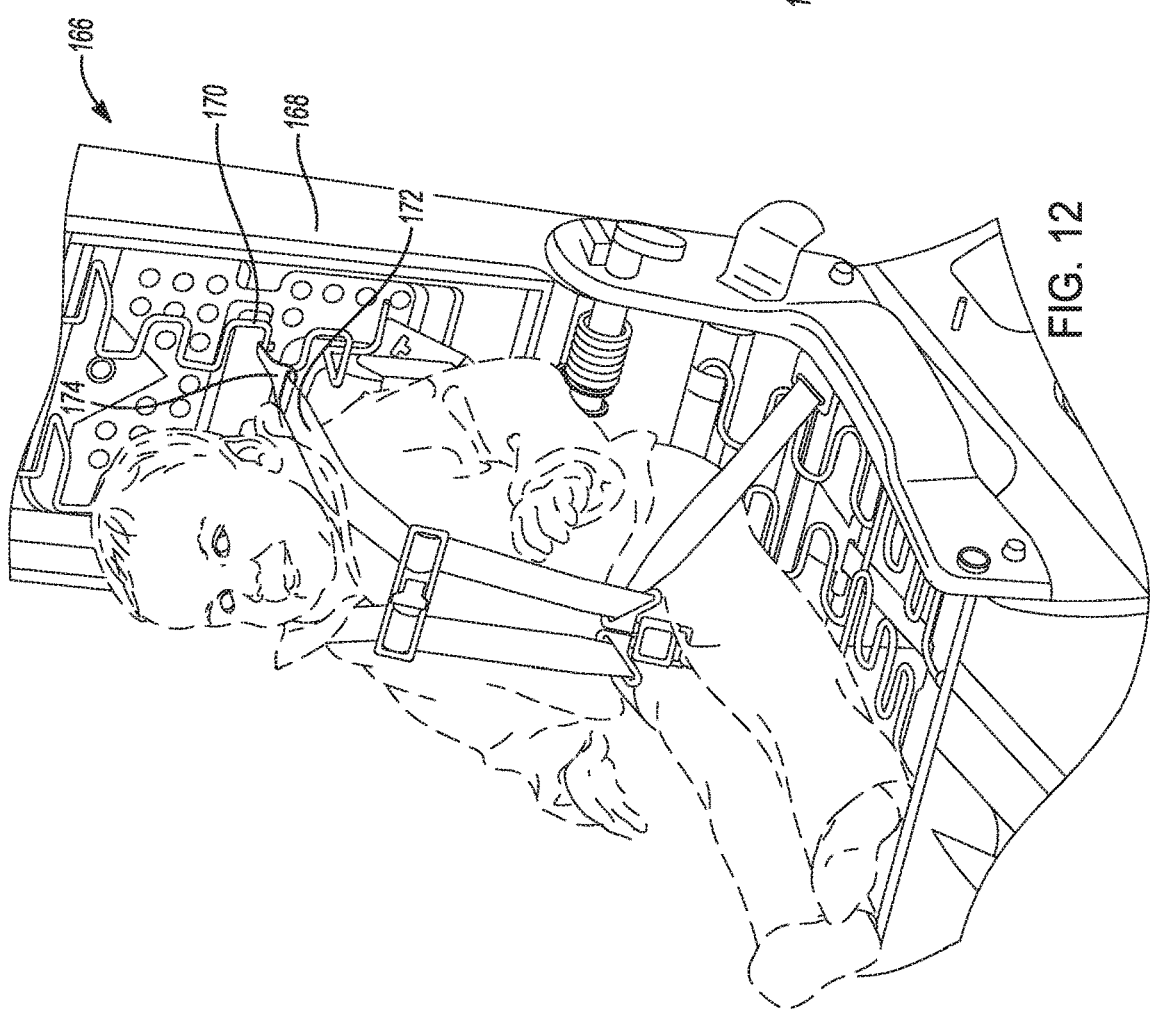
FIG. 12 is a front left perspective view of a child seat upper harness attachment system according to a further aspect.

Referring to FIG. 13 and again to FIG. 12, the first seat belt 172 is led through a chest connector 175 which is similar to the second chest connector 146 described in reference to FIG. 10, and through a buckle coupling member 176 which is similar to the second buckle coupling member 150. The buckle coupling member 176 is releasably coupled to a 3-point buckle 178 similar to the 3-point buckle 156 and the first seat belt 172 is then led to a first guide member 180. A second seat belt 182 is releasably attached to a second tube member (shown and described in greater detail in reference to FIG. 14) using a hook member defining a second hooked belt clip 184. The second seat belt 182 is led through the chest connector 175 and through a buckle coupling member 186 which is similar to the first buckle coupling member 134. The buckle coupling member 186 is also releasably coupled to the 3-point buckle 178 and the second seat belt 182 is then led to a second guide member 188.

Figure 13:
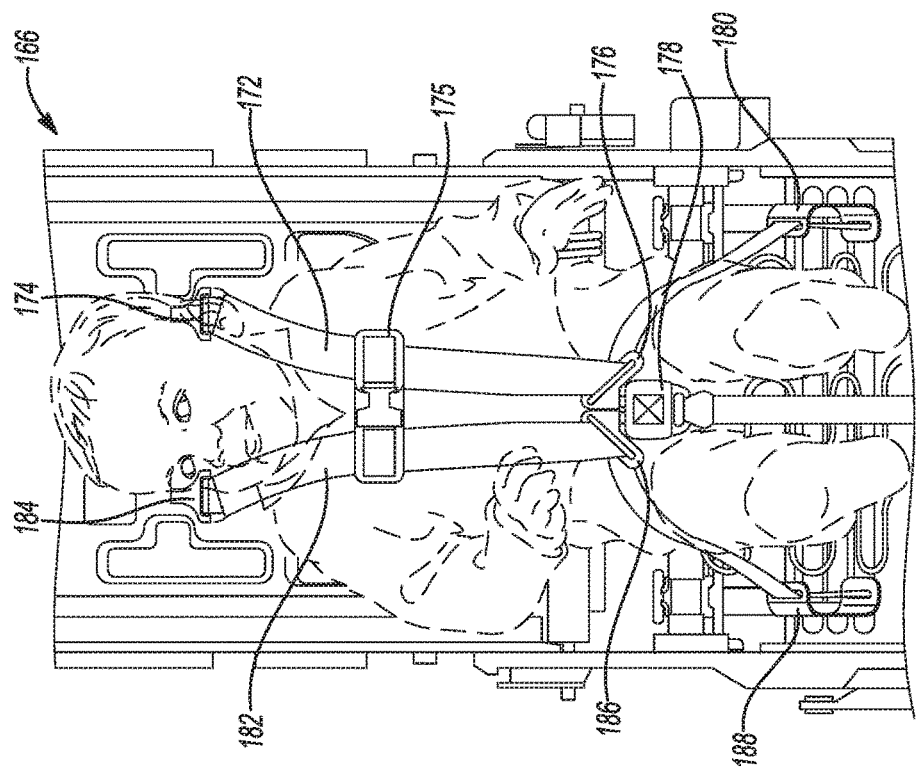
FIG. 13 is a front elevational view of the child seat upper harness attachment system of FIG. 12.

Referring to FIG. 14 and again to FIGS. 12 and 13, a second sinuous tube member 190 is positioned substantially parallel to the first sinuous tube member 170. Each of the first sinuous tube member 170 and the second sinuous tube member 190 are identical, therefore the following discussion of the second sinuous tube member 190 applies equally to the first sinuous tube member 170. The second sinuous tube member 190 includes multiple horizontal tube portions. Successive ones of the horizontal tube portions such as a first horizontal tube portion 192 and a second horizontal tube portion 194 are spaced apart at a common spacing 196 such that connection of the first hooked belt clip 174 and the second hooked belt clip 184 can be made to horizontal tube portions of both the first sinuous tube member 170 and the second sinuous tube member 190 located at a common elevation. According to several aspects, each of the first sinuous tube member 170 and the second sinuous tube member 190 include vertical sections such as a vertical section 198. The first hooked belt clip 174 and the second hooked belt clip 184 can also be releasably connected at any one of the vertical sections.

Figure 14:
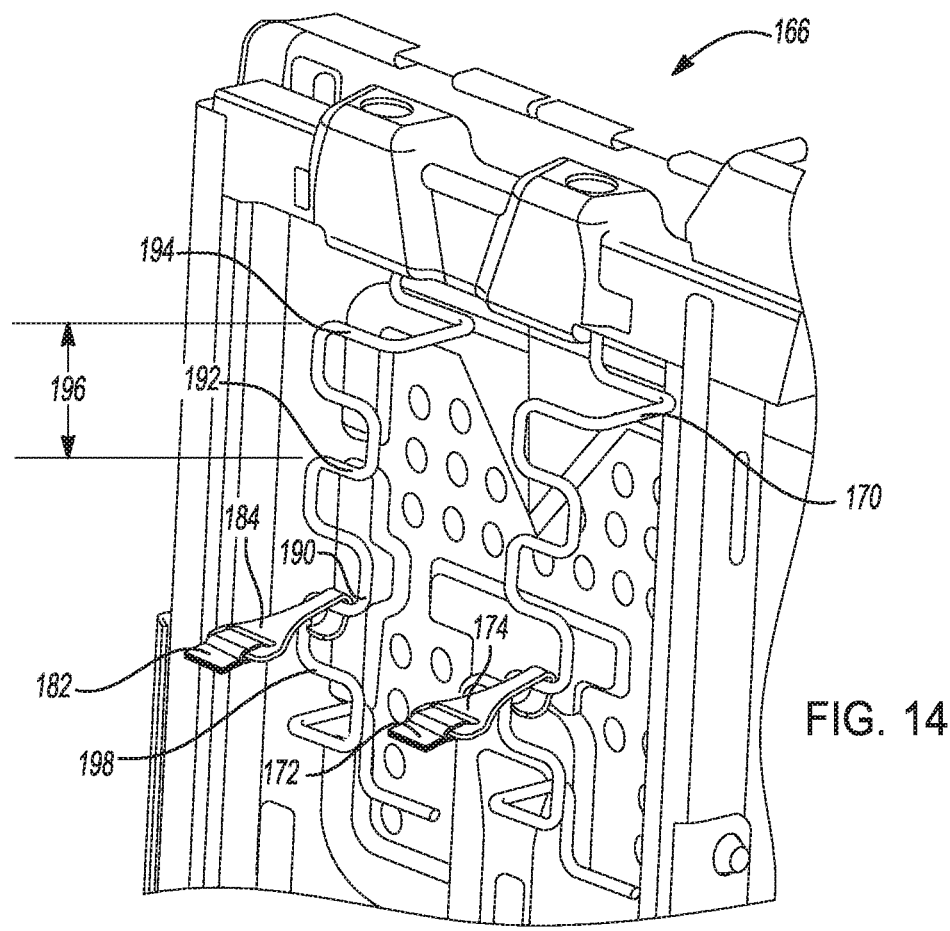
FIG. 14 is a front left perspective view of the child seat upper harness attachment system of FIG. 12 presenting the attachment members.
Figure 15:
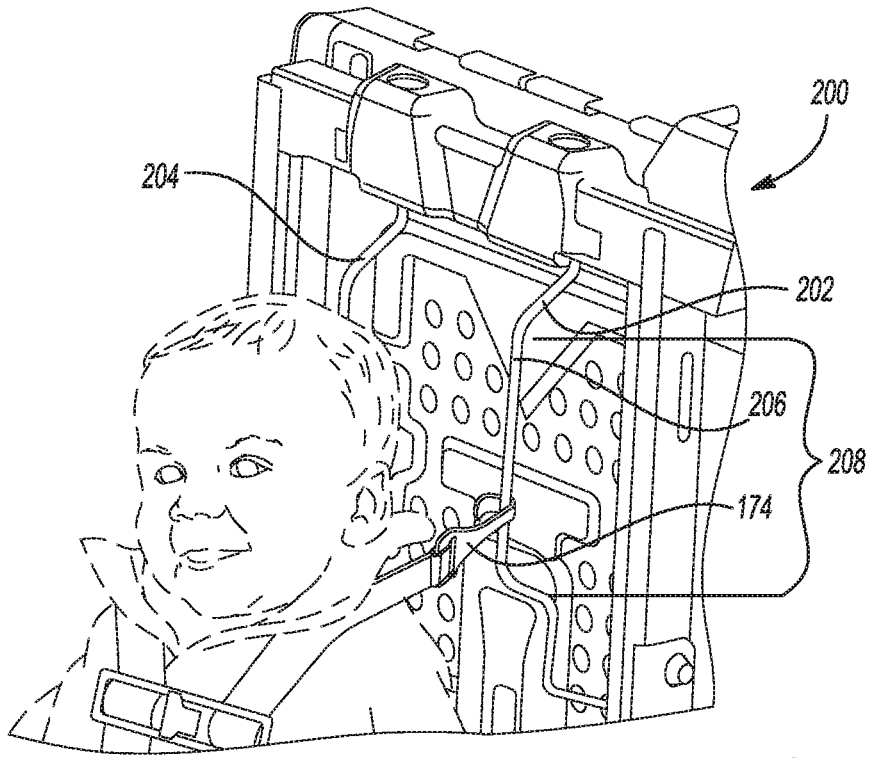
FIG. 15 is a front left perspective view of a child seat upper harness attachment system modified from FIG. 12.

Referring to FIG. 15 and again to FIGS. 12 through 14, a child seat upper harness attachment system 200 is modified from the child seat upper harness attachment system 166 as follows. A first sinuous tube member 202 and a second sinuous tube member 204 replace the first sinuous tube member 170 and the second sinuous tube member 190. Each of the first sinuous tube member 202 and the second sinuous tube member 204 include an extended length vertical portion 206. The first hooked belt clip 174 and the second hooked belt clip 184 (not clearly visible in this view) are connected at any vertical position within a vertical range 208 along the extended length vertical portion 206. This provides a limitless choice of attachment positions, adapted to suit child occupants of varying heights, for any attachment position along the vertical range 208.

Figure 16:
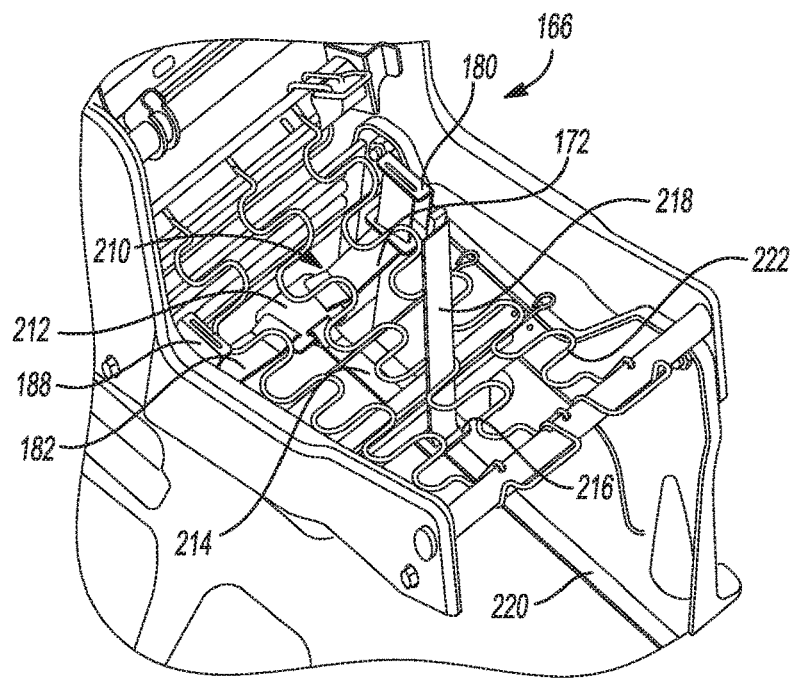
FIG. 16 is a front right perspective view of a child seat upper harness attachment system according to a further aspect.

Referring to FIG. 16 and again to FIGS. 12 through 15, an under-seat belt configuration 210 is provided for the child seat upper harness attachment system 166. The first seat belt 172 is led through the first guide member 180 and fixed to a three-way clip 212. Similarly, the second seat belt 182 is led through the second guide member 188 and fixed to the three-way clip 212. A common belt 214 is fixed at a first end to the three-way clip 212 and extends forward to a two-way clip 216. A crotch-strap 218 is fixed at one end to the two-way clip 216 and at a second end to the 3-point buckle 178 shown and described in reference to FIG. 13. A belt free end 220 extends forward of the two-way clip 216 which can be used for tensioning the belt system. Most of the components of the under-seat belt configuration 210 are located beneath a support system 222 such as a sinuous wire spring set, which support a seat base member not shown for clarity.

Figure 17:
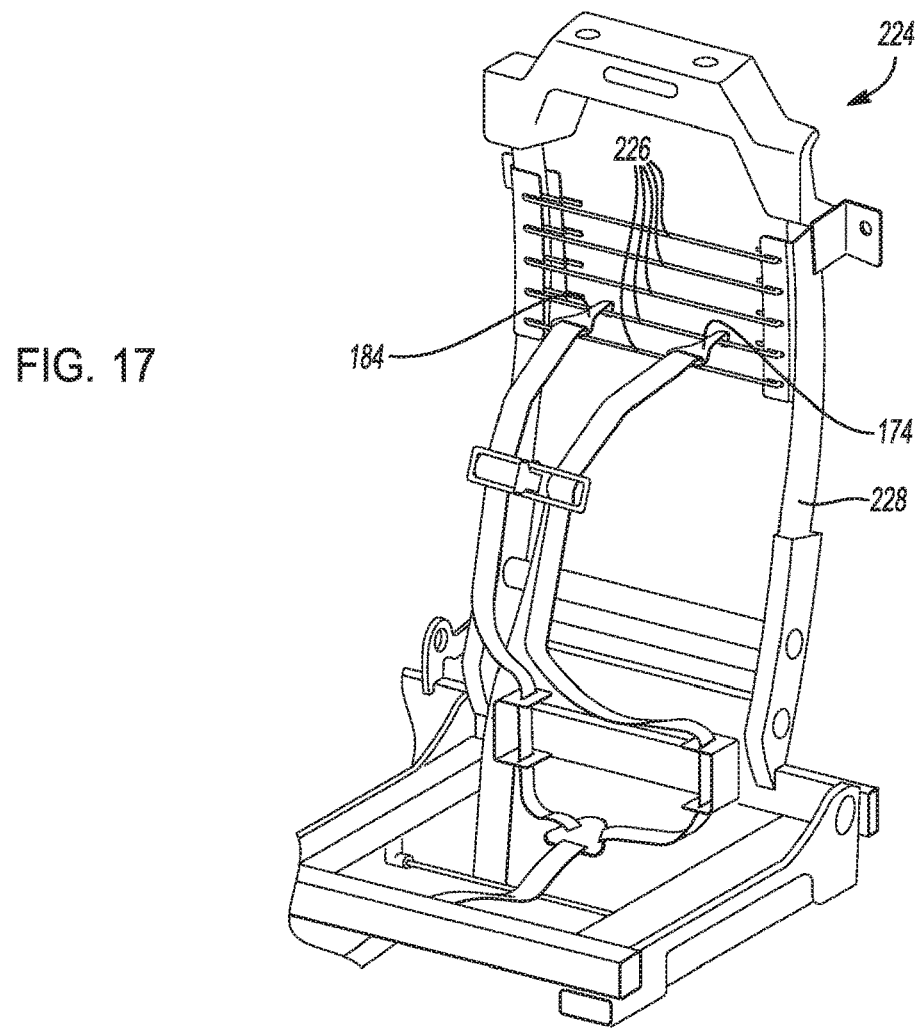
FIG. 17 is a front left perspective view of a child seat upper harness attachment system according to a further aspect.

Referring to FIG. 17 and again to FIGS. 12 through 16, a child seat upper harness attachment system 224 is modified from the child seat upper harness attachment system 166 as follows. Multiple horizontally oriented wire members 226 are connected to a seat frame 228 which replace the first sinuous tube member 170 and the second sinuous tube member 190. Each of the wire members 226 are equally vertically spaced from successive ones of the wire members 226 and are therefore all parallel to each other. The first hooked belt clip 174 and the second hooked belt clip 184 are both releasably connected to a selected one of the wire members 226 depending on a height of the child occupant 14 (not shown in this view for clarity) of the vehicle seat member.

The five-point buckle 26, the 3-point harness buckle 156 and the 3-point buckle 178 described herein each define a multiple attachment point buckle allowing a child occupant to be restrained within a vehicle seat of the present disclosure. Seat belts, clips and buckles which are normally stored within, beneath or behind the vehicle seat are extended or moved out of a storage location to engage the selected multiple attachment point buckle. Child seat upper harness attachment systems of the present disclosure provide adult and child passenger belting completely separate from each other as a poke-yoke and provide a visual distinction when the vehicle seat is configured for either the adult passenger or the child passenger. Child seat upper harness attachment systems of the present disclosure also provide auto-adjusting shoulder attachments that accommodate various sized children.

A child seat upper harness attachment system of the present disclosure offers several advantages. These include provision of additional belting on a seat to create shoulder and pelvic portions of a 5-point harness for an integrated child seat that spans all forward-facing sizes and classifications. The present system utilizes existing features in retractors as the cinching device of the child harness, therefore obviating the need to package additional mechanisms to tighten the child within the seat. The child portion of the restraint system can be retracted, hidden and moved away from adult interface/contact zones. The present system is also compatible with other seat "creature comforts" including heating and ventilation systems. Provisions also account for all sizes of children until they advance to an adult seat belt, without additional positioning (booster) required for child size fitment.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A child seat upper harness attachment system, comprising:
   a vehicle seat having a seat back and a seat base member;
   a first shoulder strap extended through at least one first aperture in the seat back and releasably connected to a multiple attachment point buckle for restraint of a child occupant of the vehicle seat;
   a second shoulder strap extended through at least one second aperture in the seat back and releasably connected to the multiple attachment point buckle for restraint of the child occupant;
   a crotch-strap extending through the seat base member and releasably connected to the multiple attachment point buckle for restraint of the child occupant;
   a plate fixed on a rear surface of the seat base member of the vehicle seat: and
   a cavity member positioned above the plate which is also fixed to the rear surface: and
   wherein the first shoulder strap, the second shoulder strap and
   the crotch-strap are removed from a storage location in or behind the vehicle seat when the child occupant is present.

2. The child seat upper harness attachment system of claim 1, further including:
   a first belt retractor assembly provides extension and retraction of the first shoulder strap; and
   a second belt retractor assembly provides extension and retraction of the second shoulder strap.

3. The child seat upper harness attachment system of claim 2, wherein the first belt retractor assembly and the second belt retractor assembly are fixed to the rear surface of the seat back.

4. The child seat upper harness attachment system of claim 1, wherein the at least one first aperture defines multiple first elongated apertures each having a common spacing between successive ones of the first elongated apertures.

5. The child seat upper harness attachment system of claim 4:
   wherein the at least one second aperture defines multiple second elongated apertures each having a common spacing between successive ones of the second elongated apertures; and
   wherein predetermined ones of the first elongated apertures and the second elongated apertures are oriented at a common elevation and define aperture pairs.

6. The child seat upper harness attachment system of claim 1, further including a first latch member and a second latch member both normally stored within a rear-facing cavity defined by the cavity member, each of the first latch member and the second latch member having an elongated slot adapted to slidably receive one of the first shoulder strap or the second shoulder strap.

7. The child seat upper harness attachment system of claim 6, further including:
   a first rail fixed to the plate and oriented substantially vertically; and
   a second rail fixed to the plate and oriented substantially parallel to the first rail;
   each of the first rail and the second rail having multiple elongated apertures which are equally spaced apart from successive ones of the elongated apertures of each rail, with pairs of the elongated apertures of the first rail and the second rail located at a common elevation.

8. The child seat upper harness attachment system of claim 7, wherein:
   the first latch member when removed from the rear-facing cavity is releasably received in one of the elongated apertures of the first rail; and
   the second latch member when removed from the rear-facing cavity is releasably received in a paired one of the elongated apertures of the second rail.

9. The child seat upper harness attachment system of claim 6, wherein each of the first latch member and the second latch member includes:

an elongated member having the elongated slot therein;

a latch member rod extending from the elongated member; and a barrel portion oriented perpendicular to the latch member rod.

10. A child seat upper harness attachment system, comprising:

a vehicle seat having a seat back supported on a seat back support structure and a seat base member;

a first shoulder strap extended through at least one first aperture in the seat back and releasably connected to a multiple attachment point buckle for restraint of a child occupant of the vehicle seat;

a second shoulder strap extended through at least one second aperture in the seat back and releasably connected to the multiple attachment point buckle for restraint of the child occupant;

a crotch-strap extending through the seat base member and releasably connected to the multiple attachment point buckle for restraint of the child occupant; and at least one belt connecting member connecting one of the first shoulder strap or the second shoulder strap to the seat back support structure; and a storage cavity created below a surface of the seat base member, the storage cavity including:

a first depth cavity portion wherein the crotch-strap is positioned for storage of the crotch-strap: and a second depth cavity portion which is deeper than the first depth cavity portion, the second depth cavity portion receiving a releasable buckle member of the crotch-strap for storage of the releasable buckle member.

11. The child seat upper harness attachment system of claim 10, wherein the seat back structure includes at least one sinuous tube member having at least one horizontal tube portion with the at least one belt connecting member defining a hook member releasably connected to the at least one horizontal tube portion.

12. The child seat upper harness attachment system of claim 11, wherein:

the at least one belt connecting member defines a first belt connecting member attached to the first shoulder strap and a second belt connecting member attached to the second shoulder strap; and the at least one sinuous tube member defines first and second sinuous tube members oriented parallel to each other.

13. The child seat upper harness attachment system of claim 12, wherein the at least one horizontal tube portion defines multiple horizontal tube portions of each of the first and second sinuous tube members, with pairs of the horizontal tube portions of each of the first and second sinuous tube members oriented at common elevations.

14. The child seat upper harness attachment system of claim 10, wherein the seat back support structure includes at least one sinuous tube member having at least one extended length vertical portion with the at least one belt connecting member defining a hook member releasably connected to the at least one extended length vertical portion.

15. The child seat upper harness attachment system of claim 10, wherein the first shoulder strap, the second shoulder strap and the crotch-strap are removed from the storage location when the child occupant is present.

16. A child seat upper harness attachment system, comprising:

a vehicle seat having a seat back supported on a seat support structure and a seat base member meeting the seat back at a bite-line located at a junction between the seat back and the seat base member;

a first shoulder strap extended through the bite-line and releasably connected to a multiple attachment point buckle for restraint of a child occupant of the vehicle seat;

a second shoulder strap extended through the bite-line and releasably connected to the multiple attachment point buckle for restraint of the child occupant;

a crotch-strap extending through the seat base member and releasably connected to the multiple attachment point buckle for restraint of the child occupant;

a first belt connecting member releasably connecting the first shoulder strap to the seat support structure and a second belt connecting member releasably connecting the second shoulder strap to the seat support structure, wherein the first belt connecting member and the second belt connecting member are positioned at a common elevation when connected to the seat support structure;

a storage cavity created in the vehicle seat for storing the first shoulder strap, the second shoulder strap and the crotch-strap therein, wherein the first shoulder strap, the second shoulder strap and the crotch-strap are removed from the storage location when the child occupant is present;

the seat support structure includes parallel first and second rails each having multiple elongated apertures which are equally spaced apart from successive ones of the elongated apertures; and the first and second belt connecting members each define a latch member having a barrel portion received in one of the elongated apertures with the barrel portion thereafter rotated approximately 90 degrees to inhibit release of the latch member from the first or second rail.

* * * * *